United States Patent [19]

Kenley et al.

[11] Patent Number: 5,276,867
[45] Date of Patent: Jan. 4, 1994

[54] DIGITAL DATA STORAGE SYSTEM WITH IMPROVED DATA MIGRATION

[75] Inventors: Gregory Kenley, Northboro; George Ericson, Schrewsbury; Richard Fortier, Acton; Chuck Holland, Northboro; Robert Mastors, Ayer; James Pownell, Natick; Tracy Taylor, Upton; John Wallace, Franklin; Neil Webber, Hudson, all of Mass.

[73] Assignee: Epoch Systems, Inc., Westborough, Mass.

[21] Appl. No.: 454,066

[22] Filed: Dec. 19, 1989

[51] Int. Cl.$^5$ .................. G06F 12/00; G06F 15/40
[52] U.S. Cl. .................................... 395/600; 395/425; 364/DIG. 1; 364/222.81; 364/243.4; 364/246; 364/246.1; 364/285; 364/285.1
[58] Field of Search ................ 395/425, 600, 200, 575; 371/10.1

[56] References Cited

U.S. PATENT DOCUMENTS

| | | | |
|---|---|---|---|
| 3,806,888 | 4/1974 | Brickman et al. | 340/172 |
| 4,429,363 | 1/1984 | Duke et al. | 364/200 |
| 4,771,375 | 9/1988 | Beglin et al. | 395/425 |
| 4,934,823 | 6/1990 | Okami | 395/164 |
| 5,018,060 | 5/1991 | Gelb et al. | 395/600 |
| 5,089,958 | 2/1992 | Horton et al. | 395/575 |
| 5,133,065 | 7/1992 | Cheffetz et al. | 395/575 |

FOREIGN PATENT DOCUMENTS

| | | | |
|---|---|---|---|
| 971285 | 7/1975 | Canada | 354/239 |
| 0205965 | 12/1986 | European Pat. Off. | |

OTHER PUBLICATIONS

Beeler, J. "GTE Tries Incremental Backup", *Computer-World*, vol. 21, No. 40, Oct. 9, 1989, pp. 61,64.
B. Brawn et al., "Data Migration and Staging Facility," IBM Technical Disclosure Bulletin, vol. 16, No. 1, Jun. 1973, pp. 205–208.
Miller (1988) "A Reference Model for Mass Storage System".
Muuss et al., "Bump The BRL/USNA Migration Project", Mar. 5, 1989, pp. 1–19.
Thompson et al., "The Operation and Use of a 2 Terabyte Optical Archival Store", *Digest of Papers, Ninth IEEE Symposium*, Nov., 1988, pp. 88–92.
Arneson, D. A., "Mass Storage Archiving in Network Environments", *Digest of Papers, IEEE Symposium,* Oct.–Nov. 1988, pp. 45–50.
Hume, A., "The File Motel—An Incremental Backup System for Unix", Summer USENIX '88, pp. 61–72.
Arnold et al., "Automatic UNIX Backup in a Mass Storage Environment", *Proceed. of USENIX Assoc.,* Feb. 1988, pp. 131–136.
Christman, "Experience With File Migration", Los Alamos National Lab report No. LA–9014, Oct. 1981.
McLarty et al., "A Functional View Of The Los Alamos Central File System", *Sixth IEEE Symposium,* Jun. 1984, pp. 10–16.
Collins et al., "A Network File Storage System", *Fifth IEEE Symposium,* Oct. 1982, pp. 99–102.

(List continued on next page.)

Primary Examiner—Paul V. Kulik
Attorney, Agent, or Firm—Lahive & Cockfield

[57] ABSTRACT

A digital data storage apparatus has primary, secondary and backing storage elements characterized by respectively longer access times. A level detector signals when the quantity of data in the secondary store exceeds a threshold amount. A data migrator responds by moving selected data files from the secondary store to the backing store. The apparatus also includes a baseline back-up element that stores archive copies of a set of selected data files. A full back-up element stores archive copies of those files that, (1) were originally copied to the baseline back-up set but have since changed, or (2) are not otherwise within the baseline back-up set. For those files which were originally copied to the baseline back-up set and which have not changed, the full back-up element stores pointers indicating locations of the respective files in the baseline back-up set.

35 Claims, 5 Drawing Sheets

OTHER PUBLICATIONS

Gwatking, Electronics Research Lab Adelaide (Australia), Report No. ERL-0009-TR, Apr. 1978.

Miller, "Direct Access Data Migration System", U.S.-D.A. Report No. USDA/DF-78/016, Mar. 1978.

Johnson, C., "IBM 3850—Mass Storage System", *AFIPS Conference Proceedings*, May 1975, vol. 44, pp. 509-514.

Johnson, C., "The IBM 3850: A Mass Storage System with Disk Characteristics", *Proc. of the IEEE*, vol. 63, No. 8, Aug. 1975, pp. 1166-1170.

Murray, "Document Based on Clustered Files", Thesis, Cornell Univ. Dept. of Computer Science, Ithaca, NY, May 1972.

Fiedler, "QBAX: An Incremental Backup Utility", *Microsystems USA*, vol. 4, No. 10, Oct. 1983, p. 84.

McGee, "Epoch Combines Magnetic Optical Drives", *Computer Systems News*, Oct. 31, 1988.

Epoch Systems press release, "Epoch Systems To Develop New Generation of High Capacity File Servers For Networked Workstations", Mar. 14, 1988.

Epoch Systems "Order Acknowledgement," Dec. 16, 1988, Epoch Systems Inc.

Epoch Systems "Invoice," Dec. 16, 1988, Epoch Systems Inc.

GTE Directories Service Corporation "Invoice," Dec. 16, 1988.

Edward Mendelson, "Backup Software For the Moment After", PC Magazine, Aug. 1989, pp. 269-319.

"Tape Backup Measuring Speed & Cost Per Megabyte", PC Magazine, Feb. 11, 1986, pp. 106-132.

DIGITAL DATA STORAGE SYSTEM WITH IMPROVED DATA MIGRATION

BACKGROUND OF THE INVENTION

This disclosure includes Appendices A, B and C, which have not been printed with the specification but are available in the application file. Appendices A and B are software for carrying out the invention. Appendix C is a copy of application Ser. No. 07/452,960, filed Dec. 19, 1989 and incorporated herein by reference.

This application relates to digital data processing and, more particularly, relates to methods and apparatus for improved data migration.

The use of storage-intensive computer applications such as high-performance, high-resolution graphics has grown significantly in recent years, with indications that it will continue to grow through the next decade. Fueling user demand has been the introduction of lower cost 32-bit workstations and an increase in the base of applications software available for those systems. Because of their computational and graphics power, these workstations are employed in data-intensive applications such as electronic publishing, computer-aided design (CAD) and scientific research.

Paralleling these developments has been the emergence of industry standard communication protocols which permit users to operate in a multi-vendor environment. Of particular interest is the Network File System (NFS) protocol, developed by Sun Microsystems, allowing users to share files across a local area network such as Ethernet.

Thus, over the past few years, available CPU power per site has grown by several orders of magnitude, due largely to the introduction of engineering workstations and personal computers. The growth in secondary storage capacity, however, has not kept pace. Data intensive applications such as mechanical CAD, electrical CAD, scientific visualization and computer generated animation are straining the data storage capability of existing file servers. The data storage requirements of professional work groups employing networked workstations can measure billions of bytes—i.e., Gigabytes—in size. Much of this results from users generating and accumulating large file sets which have aged, but which are considered valuable for future use.

Conventional options for increasing data storage capacity are often excessively costly or inconvenient to implement. Additional file servers can be incorporated into an existing computer network, but each additional server has a high incremental cost and adds to the administrative burden of managing the network.

Alternatively, the additional data can be stored offline on magnetic tape or other archival storage media. The economic costs associated with online storage of large data accumulations often compel system administrators to periodically remove apparently inactive data from online file server environment, archiving it to magnetic tape or an equivalent medium. This offline storage is much more economical than magnetic disk storage, and the use of such storage has grown commensurately with file server capacity. In 1987, a typical file server contained 105 Megabytes of data for each workstation it supported. In 1988, this typical storage level grew to 155 Megabytes, a 47% increase in one year. The typical number of archival data tapes grew from 47 to 65 per server in that same period.

While offline storage is economical, management of such offline tape libraries is often labor-intensive and error prone. Moreover, conventional archiving techniques share a number of deficiencies. For example, the selection of information to be archived is often arbitrary. Secondly, in many computing systems, such as those running under the UNIX operating system, no ready means is provided for cataloging information stored offline, requiring users to manually track their own information files. Related to these archival problems are those of migrating data—transferring computer data files, typically on off-line media, to an on-line medium, so that the files can be read and utilized by computers or processors in the network. Workstation users experience significant delays when it becomes necessary to retrieve information from the offline volumes. These delays are both frustrating and expensive.

In view of these and other problems presented by prior art data storage, the object of this invention is to provide digital data storage systems having the speed and convenience of online data storage, and the economy and large capacity of offline storage.

It is a further object of the invention to provide digital data storage systems that incorporate improved data migration methods.

Another object of the invention is to provide a data migration system that reduces the time associated with conventional data migration schemes, to the point that data migration occurs in a manner that is "transparent"—i.e., not discernable to the user.

SUMMARY OF THE INVENTION

The foregoing objects are attained by the invention, which provides a hierarchical digital data storage system enabling storage and "transparent" access to digital data. The term "transparent," as used herein, denotes access that entails no significant delay in ongoing processes. "Transparent" also refers to the apparent nature of the interface between the hierarchical storage system and existing applications programs. In particular, the invention provides a storage system interface that communicates with applications programs in a manner functionally identical to that of the existing system interface.

One aspect of the invention includes a primary storage element, a secondary storage element, and a backing store element, each selectively storing and providing access to first, second, and third sets of data, respectively. In this hierarchical storage configuration, the secondary storage element has greater storage capacity and slower access speed than the primary element. The backing store, in turn, has greater storage space and slower access speed than the secondary storage element. The backing store element can include digital optical storage elements for selectively storing and reading digital data in optical form.

A detection element compares the quantity of data stored in the secondary storage element to a selected fullness threshold, and generates a secondary-storage-full signal when the quantity of stored data exceeds the selected fullness threshold. A data migration element, in electrical communication with the detection element and the secondary storage element, automatically migrates data from secondary storage to backing store at selected times, or in response to the secondary-storage-full signal. This data migration element selects sets of data to be migrated from secondary storage to backing store, and includes a stage-out element for migrating the selected sets of data.

A file storage element in the secondary storage maintains data in the form of files, having attributes including name, size, owner, protections, time elapsed since a previous access, and type of access—i.e., read or write. In accord with this aspect of the invention, the data selection module includes a data file evaluator, responsive to the data file attributes, for selecting files to be migrated from secondary storage to backing store. Additionally, the stage-out element moves, or "stages-out," data contained in the selected data files to a predetermined staging volume of the backing store element, and, responsive to the movement of data files to the predetermined staging volume, clears storage space previously occupied by the selected files in the secondary storage element, to make the storage space available for re-use.

The system further includes a system catalog element, in electrical communication with at least the second storage element, for storing and providing transparent access to catalogued file attribute data representative of the attributes of the data files stored in the secondary storage element, and for maintaining the catalogued file attribute data after the data contained in the selected data files have been migrated to backing store. This feature enhances transparent access to file attribute data, independent of whether the file is stored in the secondary storage element or has been previously migrated from the secondary storage element.

In another aspect of the invention, the backing store stores data organized as files, and includes a file access element enabling a user or an applications program to request selected files stored in backing store. The data file access element includes a data file stage-in element for migrating, or "staging-in" selected data files stored on the backing store to the primary storage element, and concurrently writing the staged-in data files to the secondary storage element for future access, in response to access request signals asserted by a user or applications program.

In a further aspect of the invention, the backing store element includes a plurality of physical drives, such as optical disk drives. Multiple storage volumes, each containing multiple data files, can be placed in the drives, for reading and writing data. In a multi-Gigabyte file server constructed in accord with the invention, the total number of storage volumes exceeds the number of drives.

The data file stage-in element, in accordance with this aspect of the invention, can execute a batched set of file stage-in operations specified by a set of file names asserted by the user or applications program. The staged-in files can be specified by the file storage element, thereby enhancing the probability that a user-requested data file is resident in one of the plurality of physical drives. Additionally, the stage-in element implements a file system that maintains, in backing store, a digital image of the staged-in data files.

A drive multiplexor (DM), in electrical connection with backing store and the stage-in element, provides transparent access to each data volume. The DM includes a detector that generates a VOLUME-PRESENT signal representative of the presence or absence—in a particular drive—of a data volume containing a requested data file. The DM also directs data file requests to the particular physical drive containing the data volume having the requested data file. The DM can additionally include a volume insertion element, responsive to a volume request signal, for inserting a data volume containing a requested data file into a selected physical drive. A scheduler element within the DM, in electrical communication with the volume insertion element, establishes an ordered schedule of data volumes to be inserted into a selected physical drive, and generates VOLUME-REQUEST signals in accordance with the schedule, to enable a plurality of data volumes to time-share a selected physical drive.

In another aspect of the invention, VOLUME-REQUEST signals includes signals representative of relative priority of the volume requests, and the scheduler element has a priority scheduling element for establishing the schedule in accordance with the volume request priorities. A preemption element in the scheduler enables preemptive insertion of high-priority-request data volumes in place of low-priority-request data volumes.

The invention will next be described in connection with certain illustrated embodiments. However, it should be clear to those skilled in the art that various modifications, additions and subtractions can be made without departing from the spirit or scope of the claims.

BRIEF DESCRIPTION OF THE DRAWINGS

For a fuller understanding of the nature and objects of the invention, reference should be made to the following detailed description and the accompanying drawings, in which.

DESCRIPTION OF ILLUSTRATED EMBODIMENTS

Figure 1A:
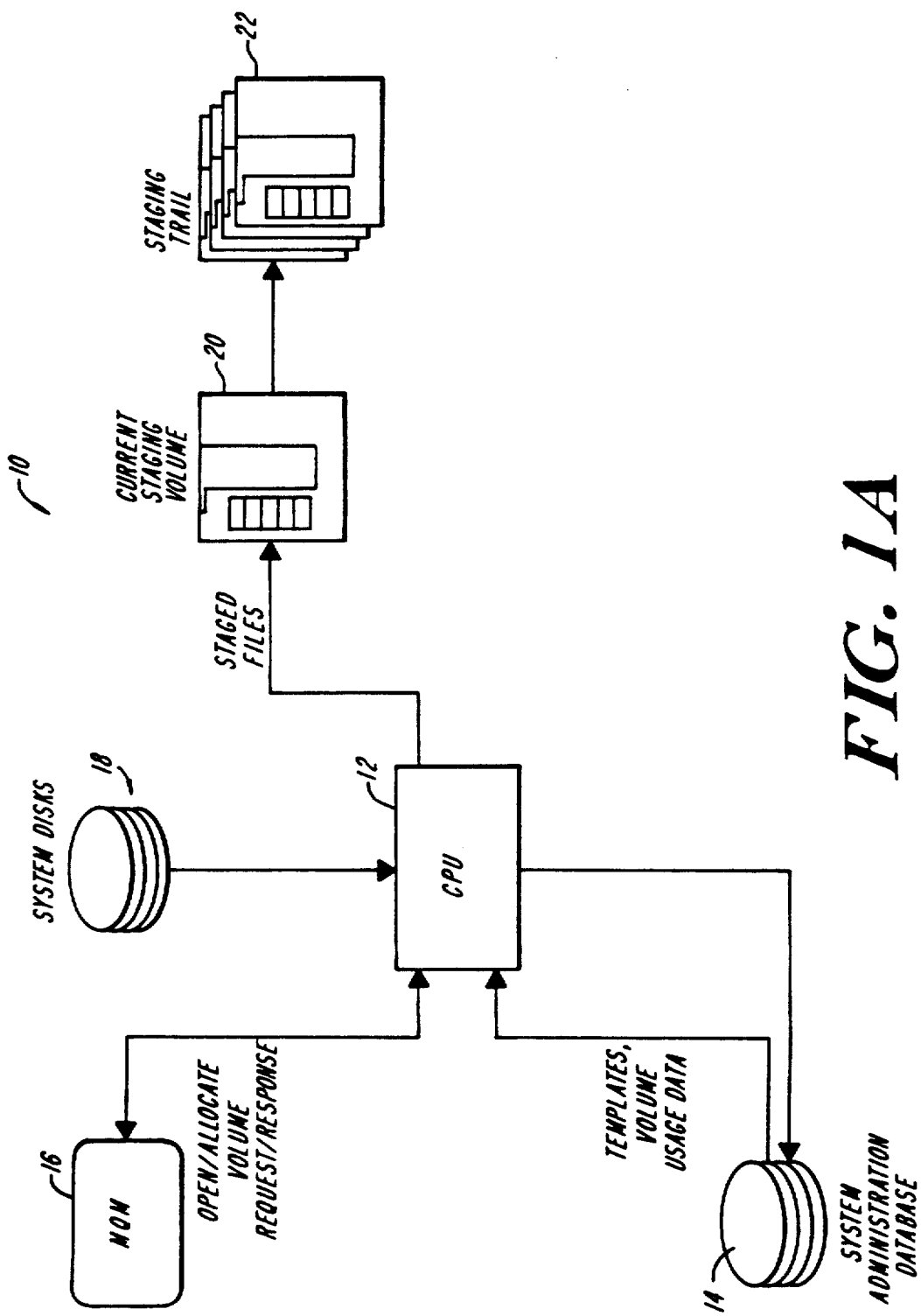
FIGS. 1A and 1B depict digital data storage and data migration apparatus constructed in accordance with the invention.

To facilitate description of the illustrated embodiments, certain terms, utilized herein to describe features of the invention, are defined as follows:

Storage Server: A computer system supporting one or more high-speed secondary storage devices, typically employing magnetic media.

Hierarchical or Mass storage server: A storage server that emulates a large amount of high-speed secondary storage through use of a fixed amount of high-speed secondary storage as a cache for a large amount of slower tertiary storage. This technique may be applied recursively to an arbitrary depth, hence the name "hierarchical" storage server.

Primary Storage: A computer system's main memory.

Secondary Storage: A storage element having higher capacity and slower speed than primary storage. The secondary storage of a hierarchical storage server constructed in accord with the invention can be magnetic or erasable-optical disks.

Backing Store: Tertiary and higher levels of storage of a hierarchical storage server. In accordance with the invention, backing store has higher capacity and lower speed than secondary storage, and can include erasable optical, write-once-read-many (WORM) disks, or tape volumes.

Backup: A duplicate copy of data from a storage server. The copy is restored if the original is lost.

Full Backup: A complete copy of a specified set of data.

Incremental Backup: A copy of a portion of a specified set or specified files of data that has been modified since a specified date, usually the date of the last full or incremental backup.

Drive: A physical hardware device that reads storage media. In accordance with the invention, a drive can be a tape or optical diskette drive.

Drive Multiplexor (DM): A system module, constructed in accordance with the invention, for managing input and output (I/O) to and from drives. The DM of the invention utilizes a robotic volume-select device to place volumes into, and remove volumes from, the drives.

File System: A subsystem of the operating system, or a self-contained subset of the secondary storage containing a collection of directories and files. The file system is usually constrained to a physical disk or partition of a physical disk.

Logical Volume: In accord with the invention, application programs refer to all off-line volumes as logical volumes. The logical volume is the key utilized by the DM to direct I/O operations to an appropriate drive.

Mount Fault: When an application program requests a volume that is not currently in a drive, a mount fault occurs. In accordance with the invention, a mount fault sequence includes (i) the operation of the volume-select robot and the setting of control structures that result in a mount fault, and (ii) handling of the mount fault. Following the mount fault sequence, the application program can utilize the requested volume. A mount fault process requires far more time than does an ordinary moving head disk access. Accordingly, the invention includes methods for avoiding mount fault conditions.

Mount Queue Manager (MQM): The portion of the invention's operating system responsible for mounting requested volumes and scheduling usage of the removable drives.

Stage-In: The process of migrating a file from backing storage to primary or secondary storage.

Stage-Out: The process of migrating files from a secondary storage element to backing store.

Volume: A physical medium, or a portion of a physical medium, such as an optical diskette or tape.

Staging Volume: A unit of backing store, usually a physical medium such as an optical diskette.

FIG. 1A depicts a digital data processing system 10 providing improved data migration, constructed in accord with a preferred practice of the invention. The illustrated system 10 includes central processor 12, which interacts with the other system components to carry out the data migration processes, including file stage-in and stage-out. Those components include a system administration database 14, a relational database that stores digital information representing system configuration and staging volume information. Additionally, a mount queue manager (MQM) 16 is provided to manage backing store volumes. Particularly, the manager 16 is responsible for volume allocation, de-allocation, and access control, in a manner described below. MQM operations are also detailed in the Appendices A and B filed herewith.

As further illustrated in FIG. 1, the system 10 includes system disks 18 storing files accessed by system users, for example, via processor 12.

In a preferred embodiment, processor 12 is a general purpose processor. Database 14 and manager 16 likewise preferably represent processes running under control of the operating system and utilizing system resources, including processor 12, system memory (not shown) and disks 18, in a manner generally known in the art and as specifically applied in accord with teachings provided herein.

Storage volume 20 and its drive also represent conventional digital data processing equipment operated by processor 12 in accord with teachings provided herein.

In the preferred embodiment discussed herein, data migration processes, including stage-in and stage-out processes, are performed by processor 12 under the control of software provided in the Appendices A and B filed herewith. The operation of the processor in this regard is described below. For ease in understanding, the processor 12 is referred to as the "data migration processor" when operating under control of the data migration software.

Backup

The processor 12 can also execute data backup operations, which are described in greater detail in co-pending U.S. Patent Application Ser. No. 07/452,960 filed on even date herewith, owned by the assignee of this application, and incorporated herein by reference, a complete copy of which is provided as Appendix C hereto, and teachings of which are excerpted in the text which follows.

Figure 1B:
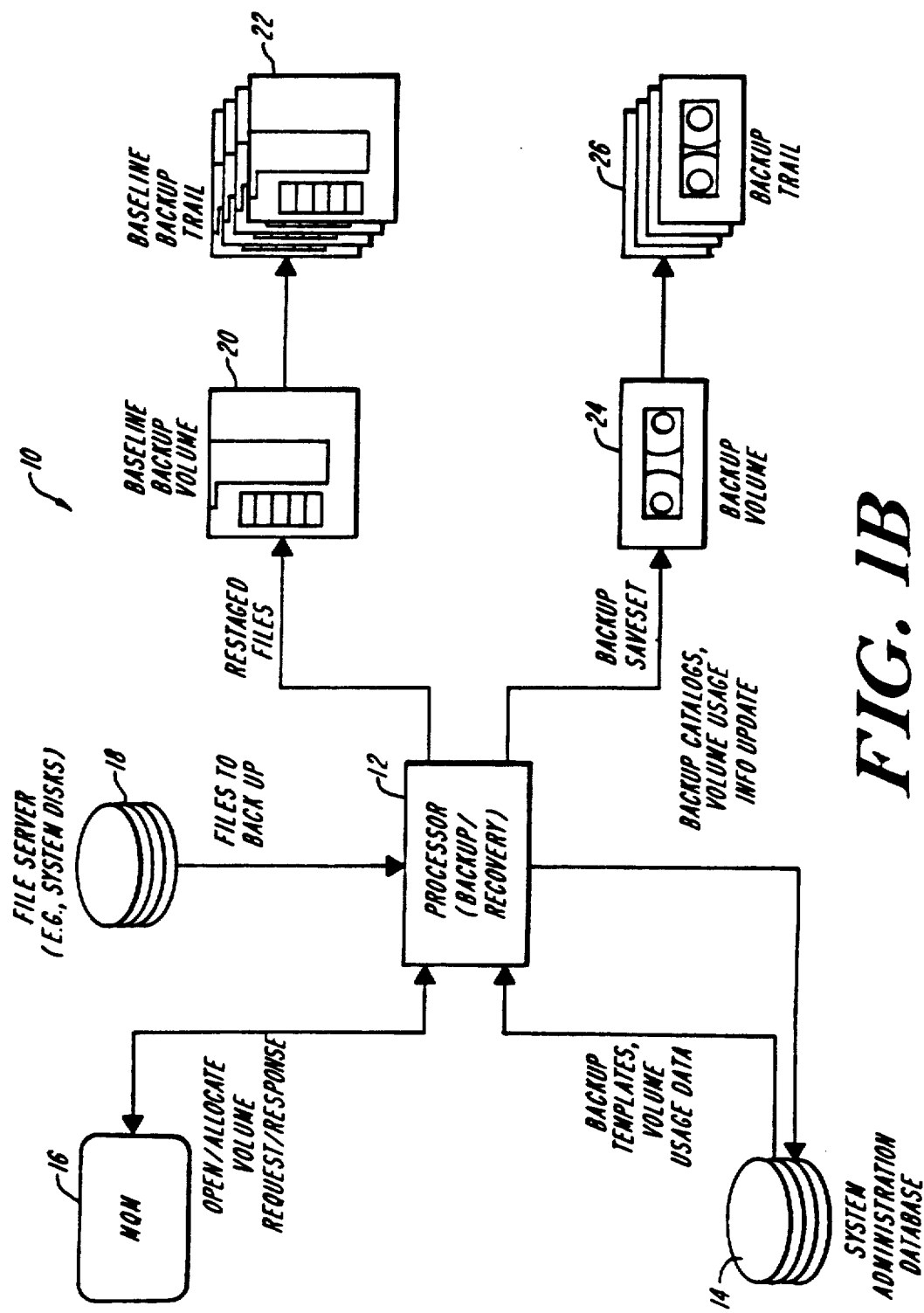

FIG. 1B depicts a digital data processing system 10 with improved backup storage constructed in accord with a preferred practice of the invention. The illustrated system 10 includes central processor 12, which interacts with the other system components to carry out backup, compaction and recovery processes, as described below. Those components include a system administration database 14, a relational database that stores digital information representing backup templates (i.e., named configurations of the backup system) and backup catalogs (i.e., lists of all files copied to specific backup savesets). Additionally, a mount queue manager (MQM) 16 is provided to manage backup volumes. Particularly, the manager 16 is responsible for volume allocation, deallocation, and access control.

As further illustrated in FIG. 1B, the system 10 includes a file server, represented by system disks 18, storing files accessed by system users, for example, via processor 12. It will be appreciated that in a high-capacity workstation or network, element 18 may represent a hierarchical or mass storage device employing magnetic disks, tapes, optical disks, and the like. Illustrated system 10 also includes baseline backup volume 20 and its associated drive (not shown), which forms a portion of baseline backup trail 22. The system 10 also includes full/incremental backup volume 24 and its associated drive (not shown), forming part of full/incremental backup trail 26.

In a preferred embodiment, processor 12 is a general purpose processor, preferably, running under the control of the UNIX operating system ("UNIX" is a registered trademark of AT&T Bell Information Systems, Inc.). Database 14 and manager 16 likewise preferably represent processes running under control of the operating system and utilizing system resources, including processor 12, core memory (not shown) and disks 18, in a manner generally known in the art and as specifically applied in accord with teachings provided herein.

Volumes 20 and 24, along with their drives, also represent conventional digital data processing equipment operated by processor 12 in accord with teachings provided herein. While volume 20 may be any storage media, preferably it is a tertiary storage media and, more preferably, an optical disk media. Moreover, while the volume 24 may represent any storage media, preferably it is a tertiary storage media and, more preferably, magnetic tape.

In the preferred embodiment discussed herein, backup processes, including baseline, full and incremental backups, and recovery processes are performed by processor 12 under the control of software prepared in accord with the teachings herein. The operation of the processor 12 in this regard is described below. For ease in understanding, the processor 12 is referred to as the "backup processor" when operating under control of the backup software and is referred to as the "recovery processor" when operating under control of the recovery software.

By way of an overview, a backup process carried out by a digital data processing system 10 constructed in accord with the invention is initiated, for example, by a system operator via a batch process or system console, who provides a backup template name. The backup processor 12 reads the specified backup template from the system administration database 14. These templates contain control parameters for the backup system, including file specifications for the baseline backup and the incremental backup. In a preferred embodiment, no file specification is used for the full backup as it covers all files.

As those skilled in the art will recognize, a file specification, or "filespec," is an expression that causes file characteristics (e.g., name and attributes) to be matched against predetermined parameters and return a boolean value indicating whether those characteristics and parameters agree. A filespec, for example, can be used to return the boolean value TRUE for all files named "/usr/foo" or, preferably, files that are stored on a tertiary volume.

The backup processor 12 uses the baseline backup filespec to locate files to be stored on the baseline backup trail 22. Selected files are copied to the baseline backup volume 20 and, if necessary, new baseline backup volumes are allocated via the mount queue manager 16. An identifier for each baseline backup copy is stored in the file directory on magnetic disk 18 as an attribute of its associated file. In one preferred embodiment, multiple identifiers are stored, permitting redundant backups and, hence, a higher degree of data security.

According to a preferred practice, the identifier includes a list of elements, each comprised of three pieces of information: the volume ID, the file starting offset, storage length and the file length. The file ID can refer to either secondary storage or backing storage in the server 18. This enables the backup processor 12 to properly backup and restore files in instances where the storage server 18 copies segments of files to multiple backing stores; or when the storage server 18 marks as obsolete only effected portions of the backing store when a file is modified, rather than marking as obsolete the entire backing store image.

During a full backup, the backup processor 12 copies to the backup volume 24 all files, except those that have already been backed up to the baseline backup trail 22 and that have not had their contents changed since the time of their baseline backup. During an incremental backup, the backup processor 12 uses the incremental backup filespec to locate files to be copied to the full/incremental backup trail 26. In addition to files having selected attributes, the backup processor 12 also copies to the backup volume 24, files (or portions thereof) previously stored to the baseline backup trail 22 that have been modified since the date of their respective baseline backup.

During both full and incremental backup procedures, the processor 12 also copies to the full/incremental backup trail 26 the file characteristics, i.e., name and attributes (including the aforementioned baseline backup location identifier), of all files whose contents have been copied to the baseline backup volumes 20.

If the file has never been copied to a baseline backup volume, the entire file contents are written to the full-/incremental backup trail 26; conversely, if file has been copied to the corresponding baseline backup trail 22 and that file has not since been changed, none of the file contents is copied. If a file was modified after being copied to the baseline backup trail 22, in addition to copying the file (or portions thereof) to the full/incremental backup trail 26, the backup processor 12 will flag the corresponding portion of the baseline backup image as being obsolete.

The backup processor 12 records to the system administration database 14 a catalog of all files backed up to the baseline backup trail 22 and the full/incremental backup trail 26.

A preferred backup processor 12 carries out the backup process with the storage server 18 on-line and available for access by its users. Contrary to prior art techniques, the processor 12 does not normally lock files during backup, relying instead upon a paradigm whereby each backed-up file is copied self-consistently during the current backup process or will be copied during the next backup process. Accordingly, the backup processor 12 attains the advantages of being both relatively inexpensive to implement and transparent to other running processes.

Preferably, the on-line backup procedure is carried out with the sequence of steps listed below.

For baseline backups

1. The backup processor 12 scans the file system, e.g., the directories of system disks 18, for candidate files to copy to the baseline backup volume 20.
2. The backup processor 12 sorts the candidates files using a two-level sort, as described below.
3. For each candidate file, the backup processor 12:
   (a) Reads the file attributes, including a write count attribute that increases each time the file is modified. The processor 12 relies on write counts instead of timestamps because, on many digital data processing systems 10, the latter do not have sufficient resolution to catch all modifications.
   (b) If the file has been modified since it was selected as a candidate, the file is skipped.
   (c) The file is copied to the baseline backup volume 20.
   (d) The baseline backup file ID is recorded as an attribute of the original file if and only if the write count of the file has not changed. If the write count has changed, the file will not have a baseline backup file ID attribute, and will therefore be copied to subsequent full/incremental backups.

For full/incremental backups

1. The backup processor 12 records its startup time as the backup date.

2. The backup processor 12 scans the file system, i.e., the directories of system disks 18, for candidate files to back up. Candidates for incremental backup are selected by the processor 12 according to the aforementioned constraints.
3. The backup processor 12 causes a table of contents for the backup to be written to the full/incremental backup volume 24. Each entry in the table includes the name of the file being copied, along with a unique file identifier which does not change if the file is renamed, but which does change if the named file is deleted and a new file is created with the same name. All files scanned during the process are entered in the table of contents, regardless of whether they are actually selected for backup. An indicator stored in each table entry reflects whether the file has been so selected.
4. For each candidate file, the backup processor 12:
   (a) Checks to see if the file changed from a directory to a non-directory file, or vice versa. Such files are skipped; since this change cannot be accomplished without modifying the file, they will be included in the next backup.
   (b) Reads the file attributes, including a write count attribute that increases each time the file is modified. The processor 12 relies on write counts instead of timestamps because, on many digital data processing systems 10, the latter do not have sufficient resolution to catch all modifications.
   (c) Initializes a retry counter. This counter, which is set to a preselected value by the system operator, determines how many times the processor 12 will attempt to backup a file before locking it.
   (d) Writes the file attributes to the full/incremental backup volume 24.
   (e) Copies to the backup volume 24 any portions of the file that are not on the baseline backup trail 22 associated with the current backup.
   (f) Reads the file attributes. If the file was deleted, the processor 12 writes out a "file deleted" indicator to the table of contents and continues with the next file (i.e., jumps to step 4(a), above).
   (g) If the file was modified, decrements and interrogates the retry counter. If that counter is non-zero, the processor 12 jumps to step 4(a), above. Otherwise, the processor 12 attempts to lock-out file accesses and copy the file to the backup volume to ensure a consistent copy. If file lock-outs are not permitted, the processor 12 writes out a "file inconsistently backed up" indicator, along with the file attributes. Such a file will be backed up consistently the next time the processor 12 runs a backup. The processor then jumps to step 4, above.
   (h) Writes out a "file consistently backed up" indicator, along with the file attributes. The processor then jumps to step 4, above.
5. If the backup completes successfully, the processor 12 records the backup date for subsequent incremental backups.

During the backup process, the processor 12 sorts the files before they are copied. For example, in a preferred system 10 in which file server 18 includes tertiary storage, the tertiary storage volume is used as the primary sort key, thereby minimizing the number of backing store volumes that must be mounted. The location of the file on that volume is used as a secondary sort key, thereby insuring good performance for those devices with slow access times, such as magnetic tapes and disk devices with slow seek times. The illustrated system 10 utilizes this two-level sort when copying files to baseline backup volumes 20 (or compacting files thereon) and to full/incremental backup volumes 24.

Those skilled in the art will appreciate that, in a system of the type described above, as files are deleted from the storage server 18, baseline backup volumes 20, 22 accumulate "dead" storage space that is not referenced by any file on the server 18. To insure rapid data recovery, the baseline backup volumes 20, 22 are compacted to control the number of active baseline backup volumes, e.g., to ensure that the number of baseline backup volumes is not significantly larger than the number of tertiary storage volumes.

Preferably, the baseline backup volumes 20 are also compacted to minimize the time required for restorals, particularly, by controlling the number of volumes in trail 22 that must be processed to perform the restoral. As a result of the compaction process, new, dense baseline backup volumes are generated that have little or no dead space.

According to a preferred practice of the invention, baseline backup volumes 20 are compacted without reading data from the entire baseline backup trail 22. Information necessary to determine whether there exist references to a baseline backup image are stored in the file server 18 itself. When the processor 12 identifies a baseline backup file that is a copy of a file which resides in the file server 18, it need not read the baseline backup volume undergoing compaction. As result, the baseline backup volume 20, 22 can remain safely in the backup vault; it is not necessary to mount them to compact them.

File recovery is performed by processor 12 executing the recover program, which interacts with same system components described above to actually retrieve the desired files. As above, the process may be initiated by the system operator, who provides to the recovery processor 12 the name of the backup template used when the files were originally backed up, along with a list of desired files (e.g., on the command line of the recover program).

The recovery processor 12 searches the backup catalogs in system administration database 14 for backup savesets with a matching backup template name. In a preferred embodiment, the processor 12 accepts a date range to bound the search; otherwise, the processor 12 begins the search with the most recent full backup and proceeds through the present. The processor 12 then searches the file catalog for each selected backup saveset for files that match those requested by the operator. Preferably, wildcard searching is supported.

Once backup volumes that contain the set of files to extract are identified, the recovery processor 12 causes the MQM 16 to open each volume in turn and to position it to the start of the backup saveset. The requested files are extracted from the backup saveset (or savesets), along with their attributes, and written to disk. In the event the contents of a requested file resides on a baseline backup volume 20, the recovery processor 12 records the name of the file in a list.

Preferably, files recovered by the processor 12 are reattached to the tertiary storage device, if any, they had at the time of backup. However, if any of the tertiary storage volumes referenced have been recycled, the file content is extracted from either the backup saveset 24 or the baseline backup volume 20, as appropriate, and the tertiary storage ID is set to NULL.

If the baseline backup volumes 20 are to serve as replacement tertiary storage volumes, recover scans all the files in the data store. For each file pointing to a non-existent tertiary storage volume, recover substitutes the baseline backup file ID for the tertiary storage file ID and sets the former to NULL.

Preferably, residency information, which is stored on the backup volumes 26, is properly restored when files are retrieved and stored back into memory 18. This residency information includes any portions of the file resident on secondary storage, as well as all pointers to backing store. It is not necessary to migrate a new copy of the file to backing store, nor is it necessary to retrieve the file from backing store if it was resident at the time of backup.

The preceding discussion describes the steps the recovery processor 12 takes when performing file recovery, i.e., a recovery process where the system operator desires to retrieve the named files from the backup volumes. According to one practice of the invention, the recovery processor also performs image recovery, which reconstructs an exact image of a directory (or file system or disk) as of the time of a particular past backup.

In performing image recovery, the recovery processor 12 executes additional steps beyond those described above. To begin, the processor 12 generally processes a full backup and all of the incremental backups to rebuild a file directory. In addition to extracting all the files in each backup saveset, the processor 12 performs all the file delete and rename operations pertaining to the directory.

Here, it will be appreciated that, when performing backup, the backup processor 12 records additional information with each backup saveset so that, when performing recovery, the processor 12 can determine which files were deleted or renamed between any two backups. More particularly, the backup processor 12 records the names and unique file identifications of all files scanned during a backup, rather than just those of the files that actually copied to the backup volumes.

Using this information, a preferred recovery processor 12 determine which files, if any, have been deleted or renamed between backups by comparing the symbol table of a current backup saveset to that of the last backup saveset processed. The symbol table of the previous backup saveset is saved by the recovery processor 12 in a temporary file when it is recovering an image.

A preferred sequence of operation for recovery processor 12 carrying out an image recovery is presented below:

1. The processor 12 reads in the a table of contents from the backup volume.
2. If the volume is an incremental backup volume 24, the processors reads in the old table of contents saved in step 6, below.
3. For each filename in the symbol table selected for recovery, the processor 12 checks if filename exists in the new symbol table but the unique file ID is paired with a different name in the old symbol table, if so, it renames the file. On systems that support multiple names for one file, the processor 12 creates a new name for the file. If the filename already exists, the processor 12 first assigns the file a temporary name. (Such can be the case with the sequence "rename a c"; "rename b a"; "rename c b").
4. For each filename in the old symbol table that is unreferenced in the new symbol table, the processor 12 deletes the file. This includes any temporary files generated in step 3, above.
5. The processor 12 extracts selected files from the backup volume, 20 or 24.
6. The processor 12 saves the current table of contents.

The procedure outlined above removes any inconsistencies that might otherwise be introduced into the file system by the backup processor 12 during the backup process. Particularly, the procedure insures that files which are deleted or renamed between backups are correctly deleted or renamed in the reconstructed image. The procedure assumes that the selected backups are sorted in date order, and that the first backup is a full backup.

An additional potential difficulty arises when a directory is renamed while backup is scanning for files, resulting in backup never "seeing" the directory and, consequently, the directory not appearing in the table of contents for the backup. To avoid deletion of the directory by the recovery processor 12, directories that appear to be deleted are preferably not removed until they fail to appear in two successive backups. Because the probability that the same directory will be renamed at the same instant in two successive backups is vanishingly small, this insures that a directory will not be improperly deleted. Those skilled in the art will appreciate that this potential difficulty does not arise for non-directory files if the renaming of such files is treated as a content modification (whereas the renaming of a directory—although considered a content modification of a directory—is not treated as a content modification of the files listed in that directory).

As those skilled in the art will appreciate, the backup of hierarchical storage servers presents additional difficulties which must be taken into consideration. First and foremost is the amount of data that must be backed up, one to two orders of magnitude more data than on a conventional storage server.

Conventional backup systems do not make backup copies of that data stored, for example, in tertiary storage. Instead, they rely on the storage migration service. A typical approach is to make two or more copies of a file on different tertiary storage volumes, using a migration policy tuned to minimize the number of accesses to non-resident files. Systems that employ such a strategy do not maintain a clear distinction between those files that are backups and those that are part of the virtual data store which happen to reside on tertiary storage.

To the contrary, a digital data processing system 10 constructed in accord with the invention relies on a backup strategy tuned to minimize the number of modifications to files on the baseline backup volume 20. The advantage of this approach is that baseline backup can use a different candidate selection policy than conventional storage migration. Since in most computer systems READ accesses far outnumber WRITE access, the baseline backups according to the present invention are intended to reduce the storage space and time required for backups.

Attached in Appendix C is a listing of preferred software modifications, intended for use in conjunction with the More/bsd UNIX operating system software commercially available from Mt. Xinu, Inc., for controlling processor 12, database 14 and manager 16 in the manner described above.

A digital data processing system 10 constructed and operated in accord with the above teachings can vastly reduce the amount of time required to back up any storage server, e.g., system disks 18, by greatly reducing the amount of data that must be copied when performing full backups. For example, given a storage server with 100 GB of data and a backup system capable of copying data at 1 MB/sec, it takes 28.5 hours to perform a full backup. If the baseline backup filespec selects 95% of the files, a baseline backup system need copy only 5 GB of data during a full backup, which takes approximately 1.5 hours. Of course, it will be appreciated that additional 95 GB of data is still copied; however, this occurs at some earlier point to the baseline backup volumes.

Particularly, the approach described above spreads out the copying of the data in a manner akin to performing daily incremental backups of changed data. Therefore, it is never necessary to copy the whole 100 GB at once. While performing only incremental backups (i.e., never taking a full backup after the initial one) also has this characteristic, such a procedure does not provide the advantages of point 2, below.

Moreover, enough information is kept so it is possible to compact the baseline backup volumes 20, that is, create new baseline backup volumes that do not contain "dead" space (images of files that were subsequently deleted). Compaction can be performed incrementally on an as-needed basis. As a result, the number of volumes in the baseline backup trail 22 (and therefore the restoral time) is a function of the amount of data to be backed up. The number of incremental backup volumes 24 in a traditional backup system is a function of the product of the amount of data to be backed up and the number of backups performed (elapsed time).

Further, it is not necessary to refer to the baseline backup volumes to perform the compaction operation. All the necessary information (file attributes and contents) is contained on the secondary store and associated tertiary store in the case of an hierarchical storage server.

Data Migration

Figure 2:
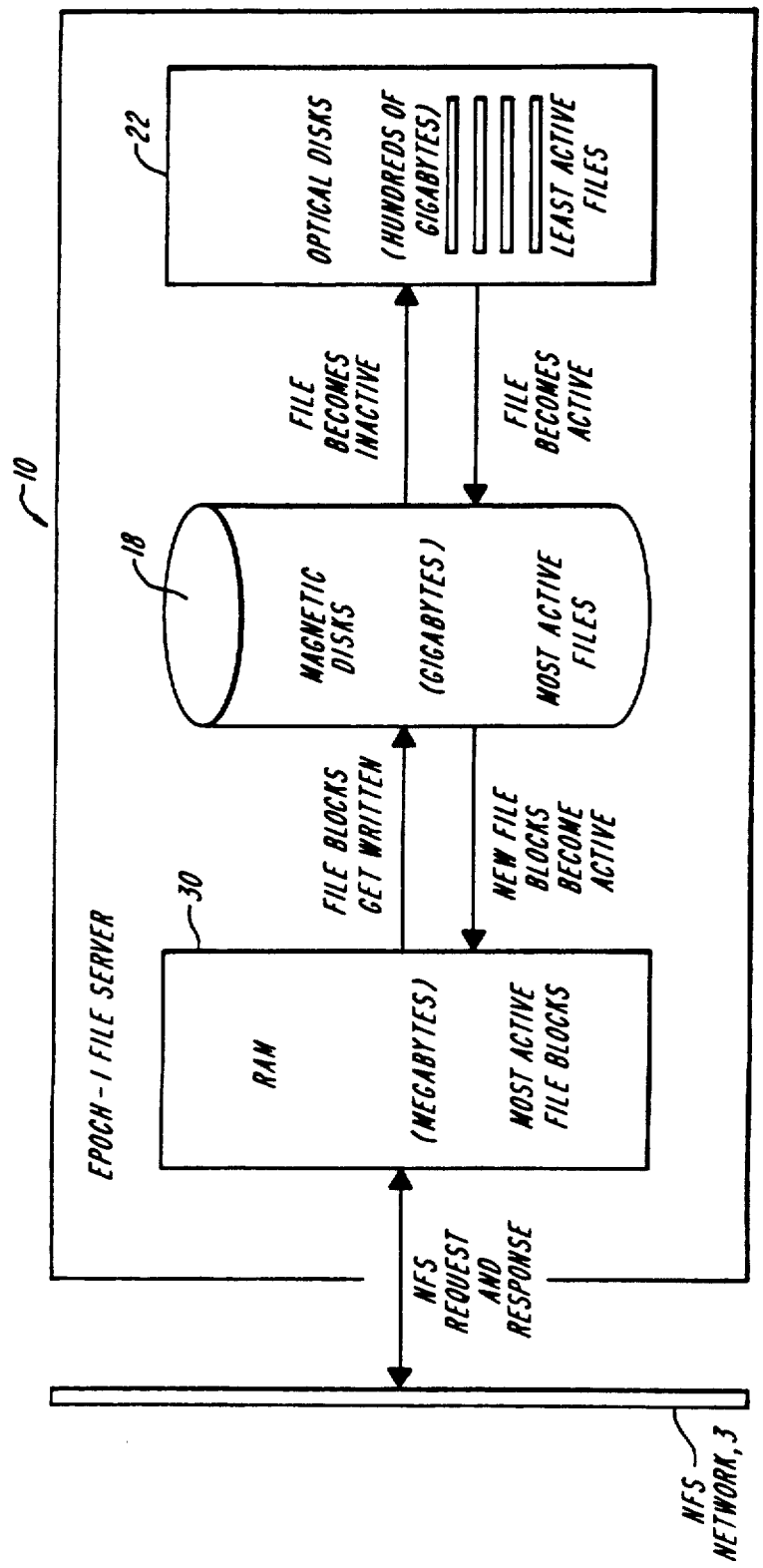
FIG. 2 is a schematic diagram illustrating the structure of a multiple-level storage hierarchy utilized in accordance with the invention.

In order to implement rapid and transparent data migration, the invention utilizes a hierarchical storage structure that is further illustrated in FIG. 2. The embodiment illustrated in FIG. 2 can be interconnected to a conventional NFS network 3, sending conventional NFS requests and responses to the network, in a manner discussed in greater detail below. This embodiment of the invention includes RAM 30, magnetic disks 18, and optical disks 22.

The invention uses optical disks 22 to exploit the high capacity of optical disk technology. In accord with the invention, relatively inexpensive optical volumes are used to emulate large magnetic disk capacities. The high speed magnetic disks 18 act as a cache for the most recently accessed files, while less active files are kept on removable optical diskettes 22. The movement of data between the magnetic volumes and the optical volumes occurs in a manner that is completely transparent to the user. Since the optical diskettes 22 are removable, the total virtual disk space available is effectively unlimited.

Manual archiving to tape in order to free up precious magnetic disk space is no longer required. Since the files' directory entries and other attributes remain on the magnetic disk, the distinction between online and offline data is less apparent than in conventional archiving systems. In embodiments utilizing an automatic optical library unit, referred to herein as a jukebox and described in further detail hereinafter, many users will not notice the online/offline distinction.

Figure 3:
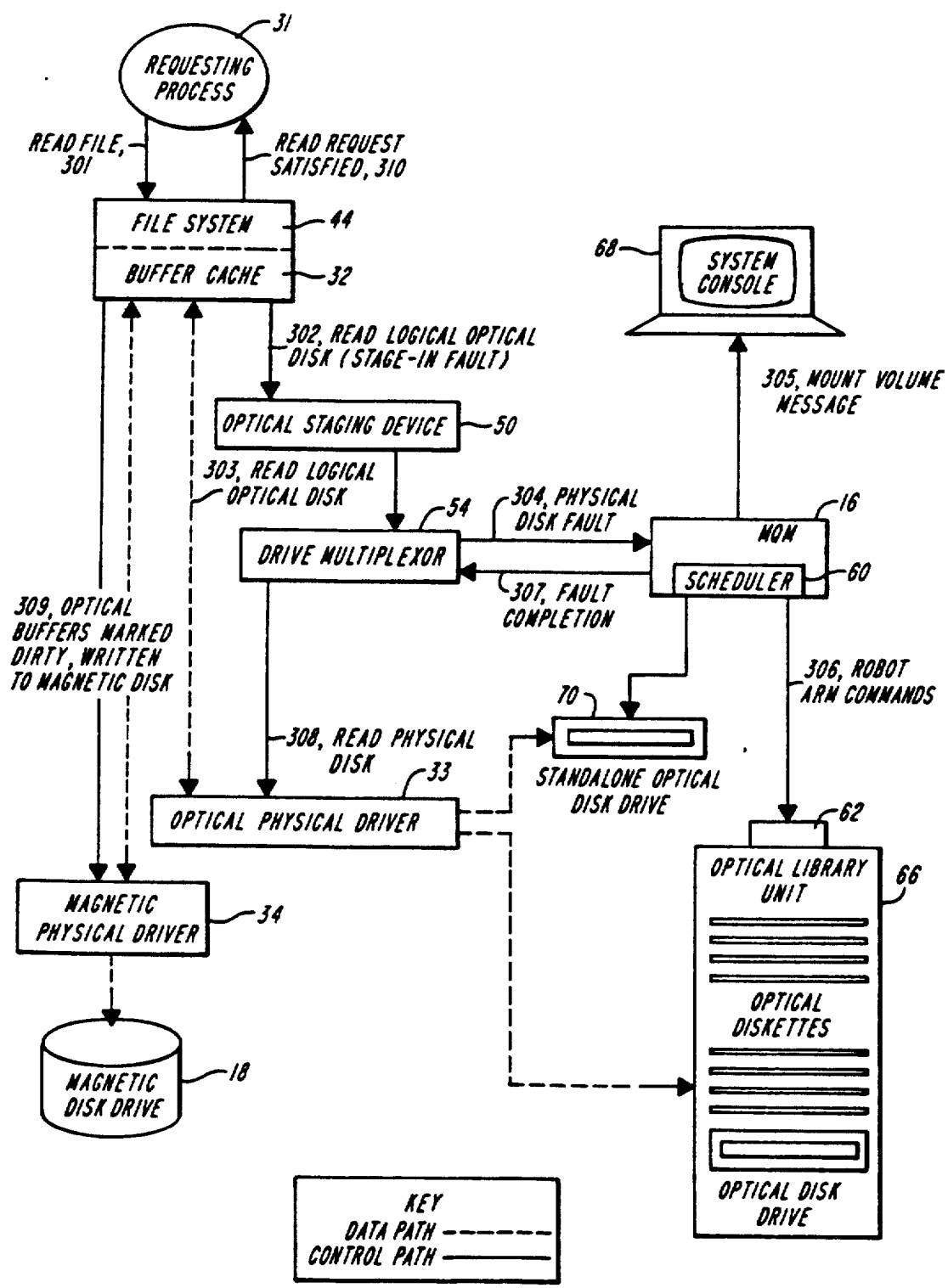
FIGS. 3 and 3B depict data and control paths of the storage and process elements in accord with the invention.

FIG. 3 depicts control and data signal transfer among the major components of a preferred embodiment of the invention, for a read request asserted by a user or requesting process 31. The illustrated embodiment includes a file system 44, buffer cache 30, optical staging device 50, drive multiplexor (DM) 54, optical physical driver 33, magnetic physical driver 34, magnetic disk drive 18, system console 68, MQM 16 containing a scheduler element 60, a conventional automated library robot arm 62, optical library unit 66, and a stand-alone optical disk drive 70.

The read request is initiated in user space and propagates through the following operations: read file (step 301), read logical optical disk and take stage-in fault (302), read logical optical disk (303), take physical disk fault (304), send mount volume message (305), send robot arm commands (306), complete fault handling (307), read physical disk (308), and mark optical buffers "dirty" and write to magnetic disk (309), read request satisfied (310). These operations are executed by the invention in accordance with the routines set forth in the attached Appendices A and B.

In the embodiment illustrated in FIG. 3, files, rather than physical disk blocks, are staged out to optical disk, and a set of direct pointers in the index node ("inode") and indirect blocks can contain a special value indicating that a particular block exists in a file but not on the magnetic disk. Such a block is said to be NOT PRESENT.

Conventional data migration systems have used WORM optical diskettes to emulate a large read/write magnetic disk at the I/O driver level, where infrequently accessed blocks are paged to the optical diskettes. This can lead to the problem of blocks of a given file being staged to many different optical diskettes. In contrast, the invention stages out on a file-by-file basis, exploiting file locality to avoid this problem.

Files can also be pre-staged—i.e., their contents can be copied to optical disk but also remain on magnetic disk. When magnetic space is needed quickly, pre-staged files can be fully staged out simply by marking the magnetic block maps with values of NOT PRESENT and freeing the magnetic blocks.

If a file has been staged out or pre-staged, it has an optical block map that refers to data on removable staging volumes, typically digital optical diskettes. These maps contain a unique volume ID, which uniquely identifies the optical diskette and the block number of the file's data within the diskette. When a block of a file is accessed and the magnetic block map shows it is not present on the magnetic disk, a STAGE-IN FAULT occurs. Although entire files are written to the optical disk at once, they are staged-in smaller blocks—in one embodiment eight kilobytes—so that only the part of the file which is needed is read from backing store and written to the magnetic disk.

Although I/O requests that cause stage-in faults are satisfied from the optical diskettes, via the RAM buffer cache (see block 30 of FIG. 2), the buffered optical blocks are also written asynchronously to magnetic disk, to allow for the possibility that they will be referenced again in the intermediate future. (The "intermediate future" is between the near future—in which requests are satisfied by the buffer cache—and the distant future—in which the file will have been staged out again and must be read from the optical disk.)

A preferred embodiment utilizes an encoding of the volume ID, and an offset in the bit file ID maintained in the inode. This permits the system to directly stage-in the file without the necessity of an intervening daemon process. Thus, staging IDs can be mapped directly to the backing store volume rather than through a database. Moreover, file that is staged-out to backing store can also have an image resident on secondary storage.

As noted above, each optical diskette is labeled with a unique volume ID. Hence, optical diskettes can be moved from machine to machine and references to optical diskettes can be uniquely resolved in network and distributed environments.

In accordance with known virtual memory practice, the system maintains a page-reclaiming process that runs periodically, or when the pool of free pages is exhausted. The decision to write a file to optical disk or free its magnetic blocks is based on statistics about the file maintained by the file system. Extensions to the file system enable a storage management daemon to obtain these statistics on many files simultaneously, thus accelerating the search for appropriate files to stage out.

A preferred practice of the invention employs a storage management policy that maintains disk space utilization between user-selectable high and low water marks, and that maintains a pool of pre-staged files, so that if the operating system indicates that a filesystem has filled to the high water mark, the magnetic-resident blocks of these pre-staged files can be rapidly cleared for re-use.

If the pre-staged pool is not large enough to bring magnetic disk utilization down to the low water mark, additional files will be selected for stage out. All files in the system are ranked as candidates for stage out based on the following formula:

$$R = \text{bias} * (\text{days\_since\_last\_access} * c1 + \text{magnetic\_kilobytes\_consumed} * c2 + \text{residence\_priority\_attribute} * c3)$$

where R is file ranking, and c1, c2 and c3 are coefficients further discussed below and in the Appendices A and B attached hereto.

Bias is an adjustable quantity that is decreased for files with holes (since holes are staged out in a preferred practice, thereby consuming space on optical disks), and files that have been written more recently than read (since the optical copy of the file is more likely to be written in the future than read, writing such a file may be wasteful of WORM space). Conversely, bias is increased for files that have been read more recently than written, since they are more likely to be read again and space on the staging disk is less likely to be wasted.

The files with the highest R values are staged out or pre-staged until the migration system's policy criteria are satisfied. This ranking of files constitutes the replacement routine. It is preferably isolated in a separate program so that it may easily be "tuned" or modified for specific user requirements.

The residence priority attribute is a user-selectable quantity that permits sophisticated users to control the staging of their files. Users may direct the system to stage out a file at the present time, at a convenient later time, or they may assign a magnetic residence priority to files, so that the files can be preemptively staged out sooner than they would normally. In a preferred practice, all users can lower the magnetic residence priority of their own files, but only an authorized "super-user" can raise the magnetic residence priority of files. The super user can also lock files onto magnetic disks so they will never be staged out.

Referring again to FIG. 3, the Optical Staging Device (OSD) 50 is a driver element that provides a conventional I/O driver interface, such as a UNIX I/O driver interface, to the file system 44. Its primary responsibility is to reliably manage space on the storage media. The OSD 50 is layered onto other drivers. Read and write operations are simply passed through to the driver below. This is illustrated in FIG. 3.

The system tracks available space on the data volumes, and enables rapid reconstruction of data structures when recovering from a system crash. This reconstruction is preferably performed automatically, the first time a volume is opened after the system comes up, and remains cached in the kernel's non-pageable memory.

The OSD 50 preferably allocates data space from the "front" of a given disk, and records each allocation as it is made, in records accumulated at the "back" of the disk. In this practice of the invention, these allocation records consume one disk sector each, and appear on the disk in large, fixed-size groups. To calculate the next available data sector, the OSD 50 locates the last-written allocation record, by performing a linear search of the last sector in each group, until a group is located in which the last sector is unwritten. This group is then scanned to find the last-written allocation record within the group.

Because group size is preferably selected to be the square root of the expected number of allocations per disk, search time as a function of the number of expected allocations is proportional to the square root of N.

As discussed above, the file system 44 opens the removable optical volumes in accordance with each volume's unique volume ID, not by the physical drive in which the volume is inserted. No I/O processes can occur until the volume is physically mounted in a drive. Coordination of selected volumes and physical drives is the responsibility of the Drive Multiplexor (DM) 54 and the Automated Library Manager (ALM) 58 indicated in FIG. 3. All volume-open operations and I/O requests pass through the DM 54, which preferably includes a conventional system driver interface, such as a UNIX system driver interface. If a selected volume is resident in a drive, the operation is vectored to that physical drive. If the selected volume is not resident in a drive, the DM 54 blocks the application until the volume is mounted and notifies a daemon implemented by the MQM 16, which directs a conventional automated library robot arm 62 to mount the requested volume in a free drive contained in optical library unit 66. These operations are preferably executed under the control of the software code set forth in the attached Appendices A and B.

Additional steps may be necessary when there are no free drives. If the new I/O request is of sufficiently high priority, a volume currently in a drive and in use may be preempted. In this case, a drive scheduler 60 of MQM 16 selects the volume with the lowest priority I/O operation underway, removes this volume from its physical drive, and replaces this volume with the newly requested volume. If all I/O requests are of equal priority, they can be scheduled on a round-robin basis. There may still be queued I/O requests for the removed volume. Any I/O requests for already opened volumes not in a drive simply wait, until the DM 54 and MQM 16 place the requested volume in a drive.

An important advantage provided by DM 54 and MQM 16 is that all offline volumes can be accessed at any time. This multiplexing of the volumes to the drives by insertion and removal of volumes is transparent to users and upper layer applications programs.

The DM and MQM thereby facilitate access to off-line volumes by applications programs. Traditional off-line volume management often required the application to make special requests to the operating system to mount off-line volumes. The requests were typically generated as special job control language or as operating system calls in the application. The DM and MQM automate this process by permitting applications to open volumes as if they were on-line. Furthermore, the system allows multiple applications to share a single drive. The system permits a medium to be mounted on different physical devices during a single open/close by the application without notification of the application.

As discussed above, to provide transparent access to off-line volumes, the DM monitors all open/close and read/write operations by the system. All operations, whether to secondary or tertiary storage, are executed with uniform device names referred to as LOGICAL DEV_Ts. These are converted into a pointer to the current location of the requested volume. If the volume is not currently mounted, it blocks the application and notifies the Mount Queue Manager that an application has requested access for that particular logical volume.

By monitoring both open/closes and read/writes, the system allows a volume to be removed from the drive while it is still open by an application. This enables the sequential sharing of a single physical drive by multiple applications. This feature is implemented by permitting all I/O operations already pending to the device to be completed, and deferring any newly arriving I/O operations by blocking the requesting process on a per-logical volume semaphore.

Additionally, as discussed above, the MQM schedules drives and controls the robotic device which moves a volume from the shelf to a drive. When the MQM detects that a volume has been requested, it selects an appropriate drive and places the volume in the drive. If there are more requests than drives in the system, the Drive Multiplexer notifies the MQM when an application has used a device for a predetermined time (a time slice). At that time the MQM selects another volume to be placed in the drive and starts the application by notifying the semaphore associated with the logical volume. Also, the DM notifies the MQM when a drive has not been closed, but is idle for a period. At this time the MQM may decide to replace the volume in the drive with another which is awaiting service.

An additional feature of DM/MQM is its ability to handle different application types. Each application can be assigned a type. This type provides the DM/MQM additional knowledge when the application makes a request. For example, an application staging data out because of water mark fault would be given more priority for a drive than an application attempting to stage-=in data for backup purposes. The request by the stage out application could result in preemption of backup requests.

Those skilled in the art will appreciate that the DM thereby provides higher level applications transparent access to offline volumes. The applications need not utilize special code or be otherwise concerned with accessing offline volumes. All volumes appear as if they are online.

Because the DM operates in a multi-tasking environment, it advantageously provides functionality to multiplex several volumes through a single drive to allow an even level of access for multiple applications. The DM also allows a volume to be opened on one drive, preempted and moved to another drive, without notification or disturbance of the application program. The DM/MQM assigns an application type to each request, allowing preemption of volumes currently in the drive, even while open by another application. The attached Appendices set forth routines for controlling the execution of DM and MQM functions.

Figure 3B:
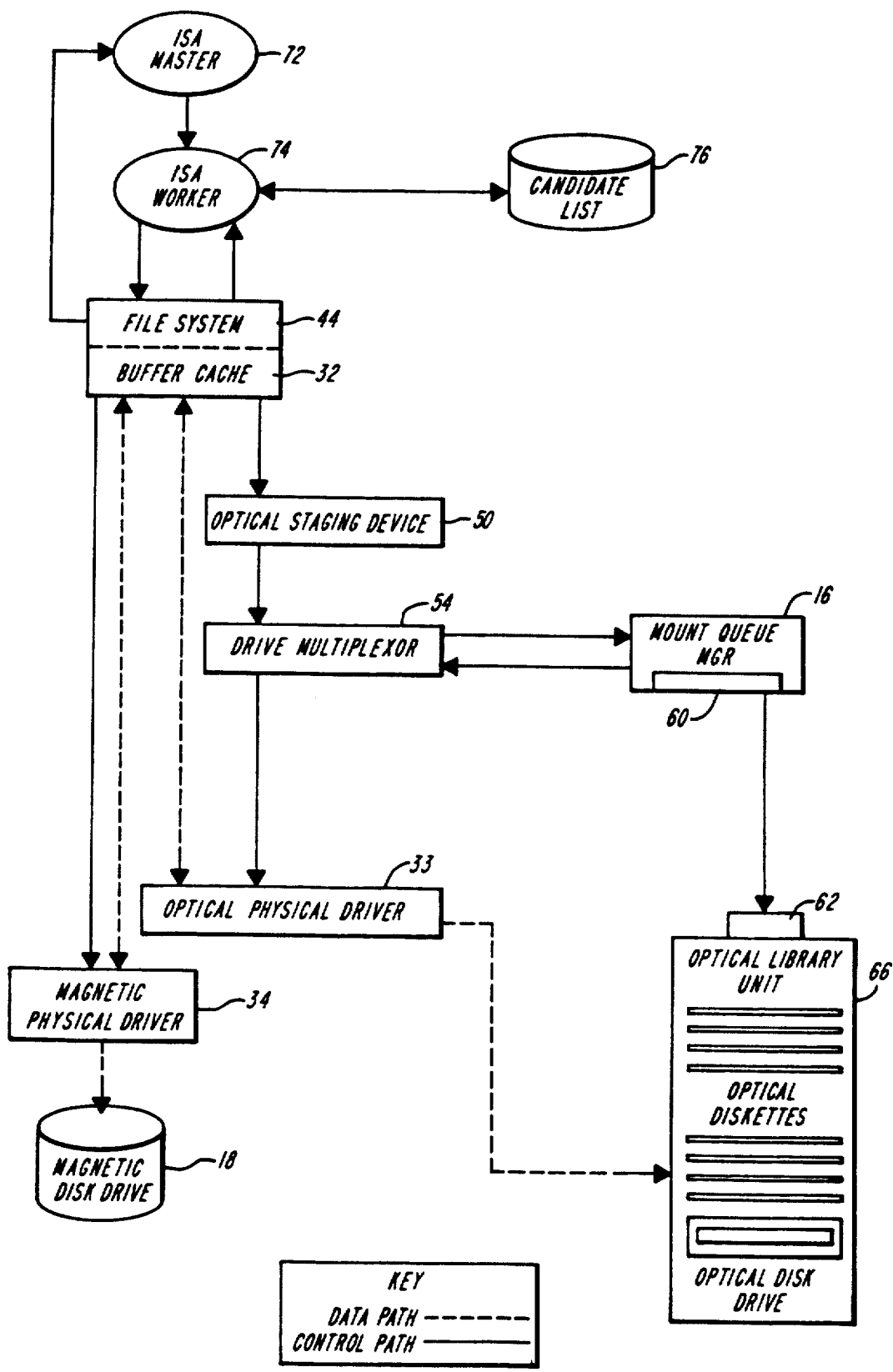

FIG. 3B provides an overview of components and operations that a preferred embodiment of the invention executes upon stage-out. The embodiment illustrated in FIG. 3B includes a MASTER PROCESS module 72, a per-file-system WORKER PROCESS module 74, the file system 44, buffer cache 32, a candidate list module 76, and the drive multiplexor 54. The candidate list module, MASTER PROCESS module, and WORKER PROCESS module are detailed in the attached Appendices.

The stage-out sequence of events begins when the file system block allocation module detects that the secondary storage utilization has exceeded a user configured threshold. If this threshold is exceeded, a block is not immediately allocated, but a high water mark fault message is sent to the MASTER PROCESS module, if no WORKER PROCESS has been started for this file system. The master process then starts a WORKER routine for this file system. These processes are executed in accordance with the routines set forth in the Appendices attached hereto.

The worker process reads the per-file control information from the file system and calculates a residence index (based in part on time since last access) for each regular file which consumes secondary storage. Each file's residence index, along with a unique file ID that can be used to access the file, and the number of secondary storage blocks this file consumes, are entered in a table. The table is sorted by residence index, and the WORKER routine executes a loop until selected number of secondary storage blocks are free. The loop consists of the following:

1. Reading a file id from the sorted list.
2. Allocating space on the backing store (and allocating a new staging volume if needed).
3. Writing the contents of the file to backing storage.
4. Updating the staging ID for this file. All other file control information remains unchanged.
5. Freeing the blocks on secondary storage that this file consumes.
6. Notifying the processes waiting on the free space semaphore, which allows it to attempt to allocate space again.

The staging-in operation utilizes the same system components as those employed by staging-out. As discussed above, all information the file system maintains about a file remains unchanged, even if the file is staged out. This allows the file system's existing file open mechanism, as well as any file system functions that read or write information about a file, to remain unchanged.

It is not until the actual contents of a file are accessed, either due to a read or a write, that the file system detects that the file has been staged out. The system checks for a block map entry—i.e., a table of block numbers, in which each block of a file consumes one slot in the table. If there is no block map entry for the block to be read or written, the following additional steps are taken:

1. The file system opens the staging volume and the drive multiplexor, and arranges for the correct volume to be inserted into a drive.

2. The file system allocates secondary storage blocks.

3. The file system reads the staged out blocks into main memory buffers.

4. The file system changes the main memory buffer control structures to indicate that the data refers to the newly allocated secondary storage blocks, not the backing store blocks. It writes the buffers back to the secondary storage.

5. The file system updates the file's block map to reflect the newly allocated secondary storage blocks.

6. The file system now continues to execute its normal operations, copying data to or from the user's program as requested.

In a further referred embodiment of the invention, the processor 12 executes a bulk stage-in (BSI) utility that reads a list of file names the user expects to reference, and ensures that each listed file is present. The BSI interrogates each file system to determine how much available space it currently has on secondary storage. The BSI then constructs an available-space table, containing rows of the file system names and available secondary storage in it.

For each file name in the list, the BSI obtains file attribute information from the file system and creates a file table whose rows contain file name, the staging volume on which each file resides, and the number of blocks of secondary storage needed to fully stage-in each file.

The BSI decrements the available space value in the available-space table for the file system on which this file resides, by the amount of space required to fully stage-in this file. The file table is then sorted by staging volume, and the file table is processed in its new order. Each file in the file table is staged-in by reading the last byte of the file.

Several data storage and migration systems have been constructed in accordance with the invention. Testing of these systems has indicated that performance can be optimized by attention to the following:

1. The relative sizes of the magnetic disk partition which acts as a cache and the data on optical storage which is cached.

2. The hit rate in the magnetic cache.

3. Distribution of data across the optical diskettes.

4. The number of mount faults processed per day.

In a current embodiment, after accounting for overhead due to file system structures, the system provided magnetic space for 585,000 kilobytes (KB) of file data. Approximately 37% of all files in this embodiment are symbolic links or directories which are not staged, reducing the effective size of the cache to 502,000 KB. There are currently approximately 2.42 Gigabytes of data staged out to optical disks. Some of this data is pre-staged. To calculate the ratio of optical space to physical space, the user must account for pre-staged files, and determine the number of blocks in use on the magnetic disk partition, in addition to the size of the partition.

The number of blocks in use on the partition varies greatly as files are staged in and out. Since the system periodically brings disk utilization to the low water mark, the low water mark can be utilized as the reference point for calculating the virtual/physical storage ratio. The low water mark can be set, for example, at 85% of the partition size. This figure leads to a virtual/physical storage ratio of 5:1, a ratio equal to or exceeding virtual/physical ratios found in conventional virtual memory environments.

A preferred embodiment of the invention asynchronously pre-reads optical data when a stage fault occurs. As a result, cache miss rates can be calculated in either of two ways: (i) as the number of optical blocks read, divided by the total number of blocks read from the file system, or (ii) as the number of blocks read where the pre-read did not keep pace with the user, causing a process to wait or block while waiting for data to be retrieved from the optical disk. Although miss ratios tend to vary with daily activity on the system, representative values are 5.5% for all cache misses, and 0.7% for a cache miss resulting in a process blocking to wait for the completion of the I/O. Thus, 99.3% of all file system reads are not affected by the tertiary level of storage. Furthermore, excluding mount faults, the median delay introduced when a process blocks is usually less than 64 milliseconds.

Those skilled in the art will appreciate that while the invention has been described in connection with certain coefficients in the replacement algorithm, other implementations, using other coefficients, can be utilized, and are within the scope of the invention. Modifying the coefficients of the replacement routine alters the relationship between access frequency and the age of staging volumes, and changes the percentage of blocks on older volumes corresponding to deleted files. Cache hit rates will also vary with different virtual-to-physical ratios.

In one practice of the invention, mount faults have been reduced from 56 faults per day to 25 faults per day. Installation of an automated optical library unit, with robotic volume select device, renders this small number of faults virtually unnoticeable.

It will thus be seen that the invention efficiently attains the objects set forth above, among those made apparent from the preceding description. It will be understood that changes may be made in the above construction and in the foregoing sequences of operation without departing from the scope of the invention. It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall therebetween.

Having described the invention, what is claimed as new and secured by Letters Patent is:

1. Digital data storage apparatus having improved backup and providing on-line access to migrated digital files, the apparatus comprising primary storage means having a first quantity of storage locations and a first access speed, for storing a first plurality of digital files, secondary storage means having a second quantity of storage locations and a second access speed, for storing a second plurality of digital files, wherein the second quantity of storage locations is greater than the first quantity of storage locations and the second access speed is slower than the first access speed, backing store means, having a third quantity of storage locations and a third access speed, for storing a third plurality of digital files, wherein the third quantity of storage locations is greater than the second quantity of storage locations and the third access speed is slower than the second access speed, and wherein each of the digital files included in any of the first, second, and third plurality of digital files has an associated characteristic, including file attributes including at least one of, file name, file size, file owner, file protections, time elapsed since a previous access, and type of access, secondary storage level detection means for detecting how many of the second plurality of storage locations are being used for storing digital files, and for generating a secondary-storage-full signal when more than a preset number of the second plurality of storage locations are being so used, file migration means, in electrical communication with the secondary storage level detection means, with the secondary storage means, and with the backing store means, for automatically migrating digital files from the secondary storage means to the backing store means at selected times, the file migration means including file selection means, in electrical communication with the secondary storage means, for selecting, in response to the secondary-storage-full signal, digital files to be migrated from the secondary storage means to the backing store means, and stage-out means, responsive to the data selection means, for migrating digital files, selected by the data selection means, from the secondary storage means to the backing store means, a baseline-backup means, coupled to said primary storage means, for retrieving from said primary storage means, digital files having a first associated characteristic, for storing copies thereof, and for generating signals representative of storage locations of respective ones of said copies, wherein said copies are referred to as baseline-backup copies, and a full-backup, coupled to said primary storage means, for
 i. retrieving, from said primary storage means, digital files for which baseline-backup copies are not stored, or for which baseline-backup copies are stored, but which have been updated since a time of their retrieval from said primary storage means for storage as baseline-backup copies, and for
 ii. storing, along with the full-backup copies, the file identifiers and the storage location-representative signals associated with files for which baseline-backup copies are stored, but which have not been updated since a time of their retrieval from said primary storage means by said baseline-backup means for storing as baseline-backup copies, wherein said storage location-representative signals are indicative of where the baseline-backup copies are stored.

2. Apparatus according to claim 1, wherein
said file selection means includes file evaluation means, responsive to said file attributes, for selecting files to be migrated from the secondary storage means to the backing store means, and
said stage-out means includes means for moving the selected files to a predetermined staging volume of said backing store means, and for clearing storage locations previously occupied by said selected files in said secondary storage means to make said storage locations available for re-use.

3. Apparatus according to claim 2, further comprising system catalog means, in electrical communication with at least said secondary storage means, for storing and providing transparent access to catalogued file attribute data representative of said attributes of said files stored in said secondary storage means, and for maintaining said catalogued file attribute data after the data contained in said selected files have been migrated to said backing store means, so that transparent access to file attribute data is provided, independent of whether the file is stored in said secondary storage means or migrated from said secondary storage means.

4. Apparatus according to claim 2 wherein said migration means includes staging trail means for establishing a set of volumes in said backing store means into which selected files from said secondary storage means are migrated,
said staging trail means including means for storing said selected files from said secondary storage means, and for storing file attributes associated with said files, including any of file name, file size, file owner, file protections, time elapsed since a previous access, and type of access,
said staging trail means also including means for storing particular ones of said files in a selected volume contained in said set of volumes.

5. Apparatus according to claim 2, including means for grouping said files into a plurality of file systems, the total number of said file systems being less than the number of said files, and said file selection means including means responsive to selected file attributes for selecting particular files of said file systems to be migrated.

6. Apparatus according to claim 2, including means for grouping said files into a plurality file systems, the total number of said file systems being less than the said number of said files, and
said data selection means including means responsive to a bias value maintained for each of said files contained in said file systems,
said bias value being a function of selected file attributes, each of said attributes given a selected weight, wherein said file attributes include any of, days since last access, file age, file size, number of storage locations contained in said secondary storage means, file residence priority and type of last access,
said selected weight being an adjustable quantity so as to facilitate customization of file migration activity.

7. Apparatus according to claim 2 wherein said stage-out means includes fencepost means for clearing a selected quantity of storage locations previously occupied by said selected files in said secondary storage means, while leaving unmodified a selected fencepost quantity of storage locations in said secondary storage means associated with said selected files, said apparatus allowing a user's program to access said selected fencepost quantity without staging in said selected files.

8. Apparatus according to claim 7 wherein the selected fencepost quantity of storage locations is 8192 bytes.

9. Apparatus according to claim 7 including stage-in means for staging in said selected files while said selected fencepost quantity is being accessed.

10. Apparatus according to claim 1,
further comprising file access means, in electrical communication with said primary storage means, said second storage means, and said backing store means, for enabling a user to request user-selected files stored on said backing store means, said file access means including file stage-in means, in electrical communication with said primary storage means, said second storage means, and said backing store means, for staging-in selected files stored on said backing store means to said primary storage means, and concurrently writing said staged-in files to said secondary storage means for future access, in response to user-asserted access request signals.

11. Apparatus according to claim 10, wherein said stage-in means includes means for maintaining in said backing store means a stored digital image of said staged-in files.

12. Apparatus according to claim 10, wherein said file stage-in means further includes means for selectively staging-in only selected portions of said files, in response to said user-asserted access request signals.

13. Apparatus according to claim 10, wherein said backing store means includes a plurality of physical drives for reading and writing files on a plurality of physically discrete storage volumes resident in said plurality of physical drives, the total number of storage volumes being greater than the number of storage volumes resident in the plurality of physical drives at a given time, and
said file stage-in means including batch stage-in means for executing a batched set of file stage-in operations in response to a set of asserted file names,
said batch stage-in means including means for grouping said file stage-in operations in accordance with storage volumes identified therein.

14. Apparatus according to claim 13, further comprising
drive multiplexor means, in electrical connection with said backing store means, and said stage-in means, for providing transparent access to each volume of said plurality of said storage volumes,
said drive multiplexor means including detection means for detecting whether a storage volume containing a requested file is resident in a particular physical drive and for generating a volume-present signal representative of the presence or absence of the storage volume in a given physical drive.

15. Apparatus according to claim 14, wherein said drive multiplexor means further includes means, responsive to the volume-present signal, for directing file requests to the particular physical drive in which the storage volume containing the requested file is resident.

16. Apparatus according to claim 15, wherein said drive multiplexor means further includes volume insertion means, responsive to a volume request signal, for inserting a storage volume containing a requested file into a selected physical drive.

17. Apparatus according to claim 16, wherein said drive multiplexor means further includes scheduler means, in electrical communication with said volume insertion means, for establishing an ordered schedule of storage volumes to be inserted into a selected physical drive, and for generating said volume request signals in accordance with said schedule, to enable a plurality of storage volumes to time-share a selected physical drive.

18. Apparatus according to claim 17, wherein said volume-request signals include signals representative of relative priority of said volume requests, and
said scheduler means includes priority scheduling means for establishing said schedule in accordance with said volume request priorities, and
preemption means for enabling preemptive insertion of storage volumes corresponding to high priority volume requests into a selected physical drive, in place of storage volumes corresponding to low priority volume requests.

19. Apparatus according to claim 1, wherein said backing store means includes optical storage means for selectively storing and reading digital files in optical form.

20. Apparatus according to claim 19, wherein
said file selection means includes file evaluation means, responsive to said file attributes, for selecting files to be migrated from the secondary storage means to the backing store means, and
said stage-out means includes means for moving the selected files to a predetermined staging volume of said secondary storage means, and, responsive to said movement of selected files to the predetermined staging volume, for clearing storage locations previously occupied by said selected files in said secondary storage means to make said storage locations available for re-use.

21. Apparatus according to claim 20, further comprising
system catalog means, in electrical communication with at least said second storage means, for storing and providing transparent access to catalogued file attribute data representative of said attributes of said files stored in said secondary storage means, and for maintaining said catalogued file attribute data after the data contained in said selected files have been migrated to said backing store means, so that transparent access to file attribute data is provided, independent of whether the file is stored in said secondary storage means or migrated from said secondary storage means.

22. Apparatus according to claim 19,
further comprising file access means, in electrical communication with said primary storage means, said second storage means, and said backing store means, for enabling a user to request user-selected files stored on said backing store means, said file access means including
file stage-in means, in electrical communication with said primary storage means, said second storage means, and said backing store means, for staging-in selected files stored on said backing store means to said primary storage means, and concurrently writing said staged-in files to said secondary storage means for future access, in response to user-asserted access request signals.

23. Apparatus according to claim 22, wherein said stage-in means includes means for maintaining in said backing store means a stored digital image of said staged-in files.

24. Apparatus according to claim 22, wherein said file stage-in means further includes means for selectively staging-in only selected portions of said files, in response to said user-asserted access request signals.

25. Apparatus according to claim 22, wherein said backing store means includes a plurality of physical drives, for reading and writing files on a plurality of physically discrete storage volumes resident in said plurality of physical drives, the total number of storage volumes being greater than the number of storage volumes resident in the plurality of physical drives at a given time, and said file stage-in means includes means for executing a batched set of file stage-in operations in response to a set of asserted file names, said staged-in files being specified by said file means, thereby enhancing the probability that a user-requested file is resident in one of said plurality of physical drives.

26. Apparatus according to claim 25, further comprising drive multiplexor means, in electrical connection with said backing store means, and said stage-in means, for providing transparent access to each volume of said plurality of said storage volumes, said drive multiplexor means including detection means for detecting whether a storage volume containing a requested data file is resident in a particular physical drive and for generating a volume-present signal representative of the presence or absence of the storage volume in a given physical drive.

27. Apparatus according to claim 26, wherein said drive multiplexor means further includes means, responsive to the volume-present signal, for directing file requests to the particular physical drive in which the storage volume containing the requested file is resident.

28. Apparatus according to claim 27, wherein said drive multiplexor means further includes volume insertion means, responsive to a volume request signal, for inserting a storage volume containing a requested file into a selected physical drive.

29. Apparatus according to claim 28, wherein said drive multiplexor means further includes scheduler means, in electrical communication with said volume insertion means, for establishing an ordered schedule of storage volumes to be inserted into a selected physical drive, and for generating said volume request signals in accordance with said schedule, to enable a plurality of storage volumes to time-share a selected physical drive.

30. Apparatus according to claim 29, wherein said volume-request signals include signals representative of relative priority of said volume requests, and said scheduler means includes priority scheduling means for establishing said schedule in accordance with said volume request priorities, and preemption means for enabling preemptive insertion of volumes corresponding to high priority volume requests into a selected physical drive, in place of storage volumes corresponding to low priority volume requests.

31. Apparatus according to claim 1, wherein said secondary storage level detection means includes low-water-mark means for generating a low-water-mark signal when less than a low-water-mark level number of the second plurality of storage locations are being used to store digital files, and said stage-out means includes means coupled to said secondary storage means and responsive to said low-water-mark signal for migrating files from secondary storage means to the backing store means until the secondary storage level detection means generates the low-water-mark signal.

32. Apparatus according to claim 1, wherein said file migration means includes prestage reserve means for migrating, periodically, selected files from said secondary storage means to said backing store means without releasing storage locations on said secondary storage means associated with said selected files, so that client devices can continue to operate upon said selected files, and so that storage locations in said secondary storage means, occupied by unmodified ones of said selected files may be released immediately in response to a storage utilization level exceeding a selected high-water-mark level.

33. Apparatus according to claim 31 wherein said pre-stage reserve means includes means for migrating files until a selected pre-stage reserve level of secondary storage is attained, said pre-stage reserve level of secondary storage being less than said low-water-mark level.

34. Apparatus according to claim 33 wherein said prestage reserve means includes means, coupled to said stage-out means and responsive to said migrating of files thereby, for initiating said migrating of selected files without releasing storage space.

35. A method for improving backup performance and for providing access to migrated digital files, the method comprising the steps of configuring a primary storage element to have a first quantity of storage locations and a first access speed, to store a first plurality of digital files, configuring a secondary storage means to have a second quantity of storage locations, greater than the first quantity of storage locations, and a second access speed, slower than the first access speed, to store a second plurality of digital files, configuring a backing store element to have a third quantity of storage locations, greater than the second quantity of storage locations, and a third access speed, slower than the second access speed, to store a third plurality of digital files, configuring each of the digital files, included in the first, second, and third plurality of digital files, to have an associated characteristic, including, file attributes including at least one of, file name, file size, file owner, file protections, time elapsed since a previous access, and type of access, detecting how many of the second plurality of storage locations are being used for storing digital files, generating a secondary-storage-full signal when more than a preset number of the second plurality of storage locations are being so used, automatically migrating digital files from the secondary storage means to the backing store element at selected times, the migration step including the steps of selecting, in response to the secondary-storage-full signal, digital files to be migrated from the secondary storage means to the backing store element, staging-out digital files, selected by the selecting step, from the secondary storage element to the backing store means, retrieving from said primary storage means, digital files having a first associated characteristic storing copies thereof, and generating signals representative of storage locations of respect ones of said copies, wherein said copies are referred to as baseline-backup copies, retrieving from said primary storage means, digital files for which baseline-backup copies are not stored, or for which baseline-backup copies are not stored, but which have been updated since a time of their retrieval from said primary storage means for storage as baseline-backup copies, and storing, along with the full-backup copies, the file identifiers and the storage locating-representative signals associated with files for which baseline-backup copies are stored, but which have not been updated since a time of their retrieval from said primary storage means by said baseline-backup means for storing as baseline-backup copies, wherein said storage location-representative signals are indicative of where the baseline-backup copies are stored.

* * * * *